(12) United States Patent
Iwano et al.

(10) Patent No.: US 10,626,907 B2
(45) Date of Patent: Apr. 21, 2020

(54) JOINING METHOD

(71) Applicant: Toyota Jidosha Kabushiki Kaisha, Toyota-shi, Aichi-ken (JP)

(72) Inventors: Yoshihiro Iwano, Toyota (JP); Kosuke Sakurai, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 76 days.

(21) Appl. No.: 15/946,828

(22) Filed: Apr. 6, 2018

(65) Prior Publication Data

US 2018/0291944 A1 Oct. 11, 2018

(30) Foreign Application Priority Data

Apr. 10, 2017 (JP) .................. 2017-077268

(51) Int. Cl.
*F16B 25/00* (2006.01)
*B23P 19/06* (2006.01)
*F16B 5/02* (2006.01)
*F16B 25/10* (2006.01)

(52) U.S. Cl.
CPC .......... *F16B 25/0031* (2013.01); *B23P 19/06* (2013.01); *F16B 5/02* (2013.01); *F16B 5/0208* (2013.01); *F16B 25/106* (2013.01); *Y10T 29/49833* (2015.01); *Y10T 29/49835* (2015.01); *Y10T 29/49837* (2015.01); *Y10T 403/4974* (2015.01)

(58) Field of Classification Search
CPC .... F16B 25/0031; F16B 25/106; F16B 25/00; F16B 15/02; F16B 15/0208; B23P 19/06; Y10T 29/49833; Y10T 29/49835; Y10T 29/49837; Y10T 403/4974; B21D 39/034; B21J 15/066
See application file for complete search history.

(56) References Cited

U.S. PATENT DOCUMENTS

2013/0195579 A1 8/2013 Freis
2016/0091010 A1 3/2016 Freis
2017/0058934 A1 3/2017 Haak

FOREIGN PATENT DOCUMENTS

JP 2006177438 A 7/2006
JP 2007187305 A 7/2007
JP 2015174099 A 10/2015

*Primary Examiner* — Jermie E Cozart
(74) *Attorney, Agent, or Firm* — Dinsmore & Shohl LLP

(57) ABSTRACT

In a joining method for joining a first plate material and a second plate material by screwing a self-tapping screw from one direction in a state where the first plate material and the second plate material are put on top of each other, a recessed portion is formed in at least one of the first plate material and the second plate material, and in a state where the first plate material and the second plate material are put on top of each other such that the recessed portion is opened in a contacting face between the first plate material and the second plate material, the self-tapping screw is screwed from the one direction. When the self-tapping screw penetrates through the first plate material due to the screwing of the self-tapping screw, an excess part generated from the first plate material flows into the recessed portion.

4 Claims, 8 Drawing Sheets

JOINING METHOD

CROSS-REFERENCE TO RELATED APPLICATIONS

This application claims priority to Japanese Patent Application No. 2017-077268 filed on Apr. 10, 2017, which is incorporated herein by reference in its entirety including the specification, drawings and abstract.

BACKGROUND

1. Technical Field

The present disclosure relates to a joining method and a joining structure each for joining a plurality of plate materials by use of a self-tapping screw.

2. Description of Related Art

It is knot that metal plates are joined by use of a self-tapping screw (e.g., see Japanese Unexamined Patent Application No. 2006-177438 (JP 2006-177438 A)). In the technique described in JP 2006-177438 A, a self-tapping screw including a screw main body having a head formed in one end of a shaft portion having a thread ridge, and a washer mounted to the screw main body is used, and at the time when the self-tapping screw is screwed into a metal plate, the washer is compressed between the head of the self-tapping screw and the metal plate, so that drag of the self-tapping screw is prevented by friction and elasticity of the washer.

SUMMARY

In the meantime, in the joining by use of the self-tapping screw, in a case where two plate materials, i.e., a top plate and a bottom plate put on top of each other are joined by screwing the self-tapping screw thereto from one direction (one side), for example, when the self-tapping screw 300 penetrates through the top plate 201 as illustrated in FIG. 8, an excess part M generated from the top plate 201 may enter between the top plate 201 and the bottom plate 202. In such a situation, a gap S is formed between the top plate 201 and the bottom plate 202, so that dimension accuracy after the joining decreases. Such a problem cannot be settled by the technique described in JP 2006-177438 A.

Note that it is conceivable that a through-hole larger than an external-thread outside diameter of the self-tapping screw is formed in a screw-in part of the top plate for the self-tapping screw, so as not to generate the excess part. However, in this case, there is such a possibility that deterioration in water cut-off performance and backlash of the top plate might be caused due to the through-hole thus formed in the top plate.

The present disclosure provides a joining method and a joining structure each of which is able to restrain a gap from being formed between a plurality of plate materials at the time of joining the plate materials by use of a self-tapping screw.

A first aspect of the present disclosure relates to a joining method for joining a first plate material and a second plate material by screwing a self-tapping screw into the first plate material and the second plate material from one direction. The joining method includes: putting the first plate material and the second plate material on top of each other such that a first recessed portion formed in at least one of the first plate material and the second plate material is opened in a contacting face between the first plate material and the second plate material, the first recessed portion being formed in a part into which the self-tapping screw is screwed in the at least one of the first plate material and the second plate material, the first recessed portion having an inner periphery larger than an external-thread outside diameter of the self-tapping screw; and penetrating the first plate material and the second plate material with the self-tapping screw. The first plate material is placed on the near side in a screw-in direction of the self-tapping screw relative to the second plate material. An excess part generated from the first plate material at the time when the self-tapping screw penetrates through the first plate material flows into the first recessed portion.

As such, the self-tapping screw is screwed into the plate materials from one direction by pressurizing the self-tapping screw. Hereby, in a case where the plate materials are joined to each other, when the self-tapping screw is screwed in a state where the plate material having the recessed portion is placed such that the recessed portion is opened in the contacting face between the plate materials, the excess part generated from the plate material on the near side at the time when the self-tapping screw penetrates through the plate material on the near side in the screw-in direction of the self-tapping screw flows into the recessed portion opened in the contacting face between the plate materials. This makes it possible to restrain the excess part from entering between the plate materials. Hereby, it is possible to restrain a gap from occurring between the plate materials after the joining.

Note that, even if the plate materials are joined to each other by pressurizing them from two directions (the one direction and its opposite direction), it is possible to yield an effect similar to the above.

Besides, the space into which the excess part generated from the plate material flows at the time when the self-tapping screw is screwed is formed of the recessed portion opened in the contacting face between the plate materials. Accordingly, it is possible to restrain a gap from being formed in a screwed part of the plate material (e.g., a top plate) into which the self-tapping screw is screwed. Hereby, it is possible to restrain deterioration in water cut-off performance, backlash of the plate materials, and the like that might be caused when a through-hole is formed in the plate material (e.g., the top plate).

In the joining method according to the first aspect, the first, recessed portion may be formed in the first plate material. Since the recessed portion is formed in the plate material on the near side in the screw-in direction of the self-tapping screw as such, the excess part generated from the plate material on the near side effectively flows into the recessed portion formed in the plate material on the near side at the time when the self-tapping screw penetrates through the plate material on the near side. This makes it possible to further effectively restrain the occurrence of a gap between the plate materials.

In the joining method according to the first aspect, the first recessed portion may be formed in the second plate material. In this case, the excess part generated from the plate material on the near side at the time when the self-tapping screw penetrates through the plate material on the near side flows into the recessed portion formed in the plate material on the deep side. The plate material on the near side and the plate material on the deep side are put on top of each other. Hereby, it is possible to restrain the occurrence of a gap between the plate materials.

The joining method according to the first aspect may further include, in a case where a third plate material is further provided such that the second plate material and the third plate material are put on top of each other and joined to each other, putting the second plate material and the third plate material on top of each other such that a second recessed portion formed in at least one of the second plate material and the third plate material is opened in a contacting face between the second plate material and the third plate material. The second recessed portion may be formed) in a part into which the self-tapping screw is screwed in the at least one of the second plate material and the third plate material. The second recessed portion may have an inner periphery larger than the external-thread outside diameter of the self-tapping screw.

In the joining method according to the first aspect, in a case where the first recessed portion is formed in a cylindrical shape by press molding in the first plate material that is a plate material on the nearest side in the screw-in direction of the self-tapping screw, a projecting part of the first plate material toward the near side of the first plate material in the screw-in direction may be formed to have a diameter equal to or more than a diameter of a seating face of the self-tapping screw, by the press molding of the first recessed portion. With such a configuration, the entire seating face of the self-tapping screw surely sits on the plate material on the nearest side after the joining. Accordingly, even if the recessed portion is formed by press molding, it is possible to secure reliability of the joining.

In the joining method according to the first aspect, in the case where the third plate material is further provided such that the second plate material and the third plate material are put on top of each other and joined to each other, when the first recessed portion is formed by press molding, the first recessed portion may be formed in the first plate material that is a plate material on the nearest side in the screw-in direction of the self-tapping screw, such that the first recessed portion is opened in the contacting face between the first plate material and the second plate material. Further, the second recessed portion may be formed in the third plate material that is a plate material on the deepest side in the screw-in direction of the self-tapping screw, such that the second recessed portion is opened in the contacting face between the third plate material and the second plate material.

In a case where the recessed portions are formed by press molding as such, when the recessed portions are formed in the plate material on the nearest side and the plate material on the deepest side in the screw-in direction of the self-tapping screw, among three plate materials, it is not necessary to form a recessed portion in the intermediate plate material provided between the plate material on the nearest side and the plate material on the deepest side. Hereby, in a case where the recessed, portions are formed by press molding, even if three plate materials are joined to each other, the three plate materials can be joined without any gap.

A second aspect of the present disclosure relates to a joining structure in which a plurality of plate materials is joined to each other such that a self-tapping screw is screwed into the plate materials in a state where the plate materials are put on top of each other. The joining structure according to the second aspect includes: a first plate material; and a second plate material provided such that the first plate material and the second plate material are put on top of each other; and, a self-tapping screw screwed into the first plate material and the second plate material. The self-tapping screw is configured to join the first plate material and the second, plate material to each other. The first plate material is placed on a near side in a screw-in direction of the self-tapping screw relative to the second plate material. At least one of the first plate material and the second plate material has a recessed portion in a part through which the self-tapping screw penetrates, the first recessed portion being opened in a contacting face between the first plate material and the second plate material. An excess part generated from the first plate material enters the recessed portion. Even in such a joining structure, the excess part generated from the plate material enters the recessed portion. Hereby, it is possible to restrain the occurrence of a gap between the plate materials.

With the present disclosure, it is possible to restrain the occurrence of a gap between a plurality of plate materials, at the time of joining the plate materials by use of a self-tapping screw.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1A:
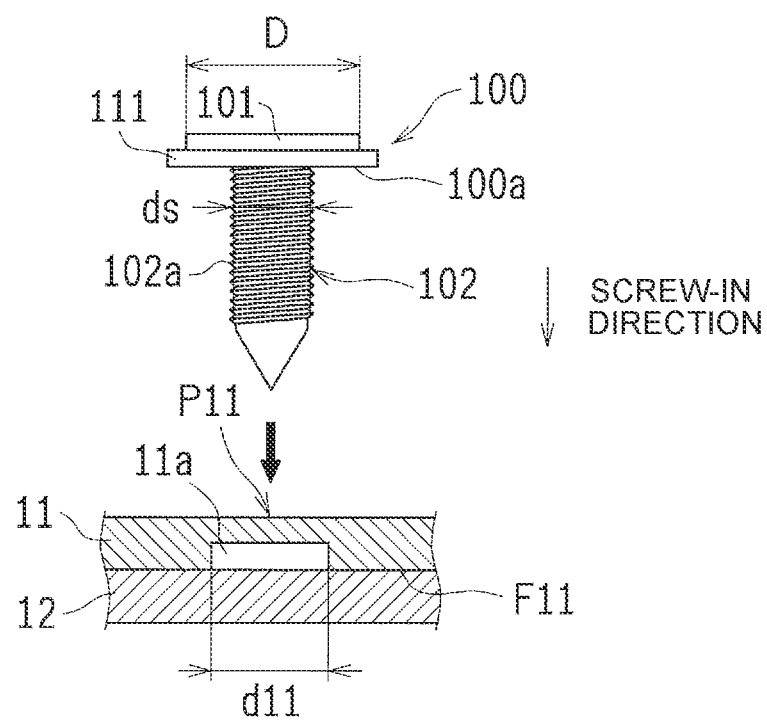
FIG. 1A is an explanatory view of one embodiment of the present disclosure, and illustrates a state before a self-tapping screw is screwed.

Embodiments of the present disclosure are described below with reference to the drawings.
Self-Tapping Screw A self-tapping screw 100 to be used in the present embodiment is configured such that a head 101, and a shall portion 102 in which a screw 102a is formed are formed integrally as illustrated in FIG. 1A. A flange 111 is formed integrally with the head 101, and the surface (the bottom surface) of the flange 111 on the shall portion 102 side serves as a seating face 100a of the self-tapping screw 100.

The following describes an embodiment in which the present disclosure is applied to a case where thin plates (e.g., 0.8 mm to 5 mm) such as body steel sheets are joined to each other with the self-tapping screw 100.

Embodiment 1

Figure 1B:
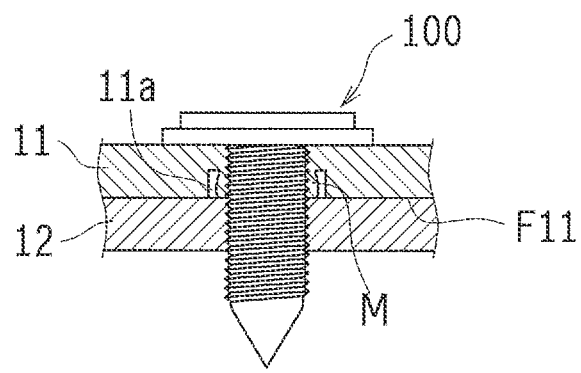
FIG. 1B is an explanatory view of one embodiment of the present disclosure, and illustrates a state where two thin plates are joined to each other with the self-tapping screw.

First described is one embodiment of the present disclosure with reference to FIGS. 1A, 1B.

The present embodiment describes a case where two thin plates (steel sheets) 11, 12 are joined to each other by screwing the self-tapping screw 100 into the two thin plates 11, 12 in a state where the two thin plate 11, 12 are put on top of each other in the screw-in direction of the self-tapping screw 100 (hereinafter just referred to as the "screw-in direction").

In the following description, in terms of the two thin plates 11, 12 put on top of each other in the screw-in direction, the thin plate 11 on the near side in the screw-in direction is referred to as a top plate 11 and the thin plate 12 on the deep side in the screw-in direction is referred to as a bottom plate 12.

In the present embodiment, before a screw-in operation of the self-tapping screw 100 is performed, the top plate 11 out of the top plate 11 and the bottom plate 12 is subjected to cutting to form a recessed portion 11a having a cylindrical shape and opened in a contacting face F11 between the top plate 11 and the bottom plate 12 as illustrated in FIG. 1A. The recessed portion 11a is formed in a screwed part P11 of the top plate 11 into which the self-tapping screw 100 is screwed. The recessed portion 11a is formed such that its center (the center of the cylindrical shape) corresponds to a screwing point of the self-tapping screw 100. Further, the recessed portion 11a has an inside diameter d11 (the size of the inner periphery of the recessed portion) larger than the external-thread outside diameter ds of the self-tapping screw 100. The inside diameter d11 of the recessed portion 11a will be described later.

In a case where the recessed portion 11a is formed in the top plate 11 as such, when the top plate 11 and the bottom plate 12 are joined to each other by screwing the self-tapping screw 100 thereto from one direction (one side) in a state where the top plate 11 and the bottom plate 12 are put on top of each other such that the recessed portion 11a of the top plate 11 is opened in the contacting face F11 between the top plate 11 and the bottom plate 12, an excess part M generated from the top plate 11 at the time when the self-tapping screw 100 penetrates through the top plate 11 flows into the recessed portion 11a opened in the contacting face F11 between the top plate 11 and the bottom plate 12 as illustrated in FIG. 1B, thereby making it possible to restrain the excess part M from entering between the top plate 11 and the bottom plate 12. This makes it possible to restrain a gap from occurring between the top plate 11 and the bottom plate 12 after the joining (in the state illustrated in FIG. 1B), thereby making it possible to secure dimension accuracy.

Further, in the present embodiment, the space into which the excess part M generated from the top plate 11 flows is formed of the recessed portion 11a opened in the contacting face F11 between the top plate 11 and the bottom plate 12. Accordingly, after the joining, no gap is formed in the screwed part (a part on the near side from the recessed portion 11a) of the top plate 11 into which the self-tapping screw 100 is screwed. Hereby, it is possible to restrain deterioration in water cut-off performance, backlash of the plate materials, and the like that might be caused when a through-hole is formed in the top plate 11.

Note that, in the present embodiment, the recessed portion 11a is just formed in the top plate 11 by cutting, so that the effect can be achieved with a small increase in cost. Further, in a case where the joining is performed by providing an adhesive between the top plate 11 and the bottom plate 12, the adhesive is filled in the recessed portion 11a of the top plate 11, thereby ma king, it possible to increase adhesive strength. The effects can be also achieved in Embodiment 2 to Embodiment 7.

Note that a step to form the state of FIG. 1A corresponds to a "step of putting plate materials on top of each other such that a plate material having a recessed portion is placed such that the recessed portion is opened in a contacting face between the plate materials" in the present disclosure, and a step from FIG. 1A to FIG. 1B corresponds to a "step of penetrating the plate materials thus put on top of each other with a self-tapping screw" in the present disclosure.

Here, in the present embodiment, the structure after the joining as illustrated in FIG. 1B is one example of a "joining structure" in the present disclosure.
Inside Diameter of Recessed Portion Next will be described a method for determining the inside diameter d11 of the recessed portion 11a formed in the top plate 11.

First, in consideration of the rigidity of the screwed part P11 of the top plate 11 into which the self-tapping screw 100 is screwed, the depth of the recessed portion 11a is determined so that a part to form the recessed portion 11a in the top plate 11 has a thickness that can secure the rigidity. For example, the depth of the recessed portion 11a is set to around 0.5 times the plate thickness of the top plate 11.

Subsequently, with the use of the plate thickness of the top plate 11 and the external-thread outside diameter ds (the nominal diameter of screw) of the self-tapping screw 100 as parameters, an excess part amount to be generated at the time when the self-tapping screw 100 is screwed into the top plate 11 is found by experiment or simulation. Then, with the use of the excess part amount thus found and the depth of the recessed portion 11a, the inside diameter d11 of the recessed portion 11a is determined so that the volume of a space formed between the outer periphery of the shaft portion 102 of the self-tapping screw 100 and the inner peripheral surface of the recessed portion 11a ([the inside diameter d11 of the recessed portion 11a–the external-thread outside diameter ds of the self-tapping screw 100]×the depth of the recessed portion 11a) in a state where the self-tapping screw 100 is screwed becomes larger than the excess part amount to be generated from the top plate 11.

More specifically, in a case where the plate thickness of the top plate 11 is 1 mm to 2 mm and the external-thread outside diameter ds (the nominal diameter of screw) of the self-tapping screw 100 is 5 mm, for example, the depth of the recessed portion 11a is set to 0.5 mm to 1.0 mm and the inside diameter d11 of the recessed portion 11a is set to 10 mm to 15 mm. In a case where the inside diameter d11 of the recessed portion 11a is set to a dimension ([ds+5 mm] to [ds+10 mm]) having a margin to the external-thread outside diameter ds of the self-tapping screw 100 as such, even if the screwing point of the self-tapping screw 100 deviates due to variations of the thin plates 11, 12 in mass production or the like, stable joining is achievable.

Here, when the inside diameter d11 of the recessed portion 11a is equal to or more than the diameter D of the seating face 100a of the self-tapping screw 100, the strength of a part on which the seating face 100a of the self-tapping screw 100 sits is lowered. In consideration of this point, in order to secure the strength of the part on which the seating face 100a of the self-tapping screw 100 sits, the maximum dimension of the inside diameter d11 of the recessed portion 11a is set to be smaller than the diameter of the seating face 100a of the self-tapping screw 100.

Embodiment 2

Next will be described another embodiment of the present disclosure with reference to FIGS. 2A, 2B.

The present embodiment describes a case where two thin plates (steel sheets) 21, 22 are joined to each other by screwing the self-tapping screw 100 into the two thin plates 21, 22 in a state where the two thin plates 21, 22 are put on top of each other in the screw-in direction.

In the following, description, in terms of the two thin plates 21, 22 put on, top of each other in the screw-in direction, the thin plate 21 on the near side in the screw-in direction is referred to as a top plate 21 and the thin plate 22 on the deep side in the screw-in direction is referred to as a bottom plate 22.

Figure 2A:
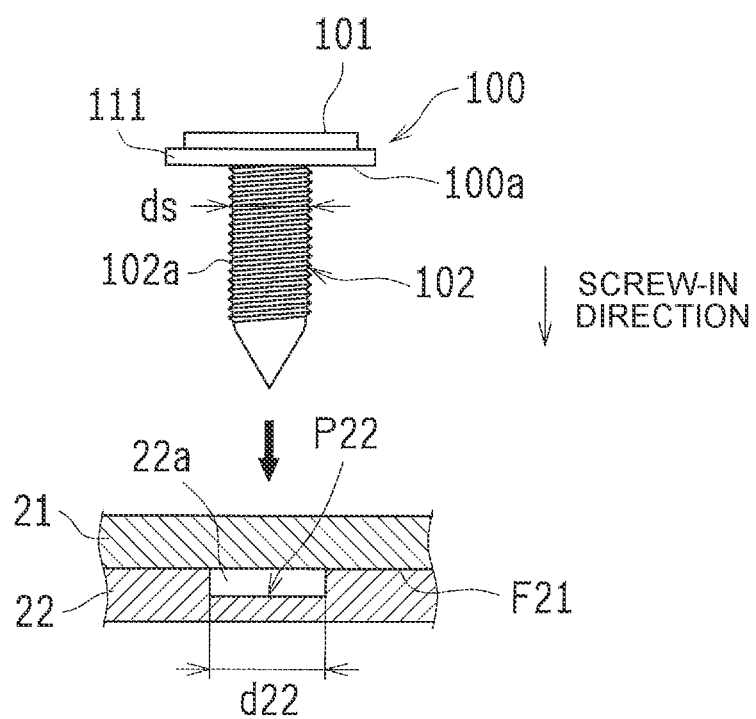
FIG. 2A is an explanatory view of another embodiment of the present disclosure, and illustrates a state before the self-tapping screw is screwed.

In the present embodiment, before the screwing operation of the self-tapping screw 100 is performed, the bottom plate 22 out of the top plate 21 and the bottom plate 22 is subjected to cutting to form a recessed portion 22a having a cylindrical shape and opened in a contacting face F21 between the bottom plate 22 and the top plate 21 as illustrated in FIG. 2A. The recessed portion 22a is formed in a screwed part P22 of the bottom plate 22 into which the self-tapping screw 100 is screwed. The recessed portion 22a is formed such that its center (the center of the cylindrical shape) corresponds to the screwing point of the self-tapping screw 100. Further, the recessed portion 22a has an inside diameter d22 (the size of the inner periphery of the recessed portion) larger than the external-thread outside diameter ds of the self tapping screw 100. The inside diameter d22 of the recessed portion 22a is determined by a method similar to the method described in Embodiment 1.

Figure 2B:
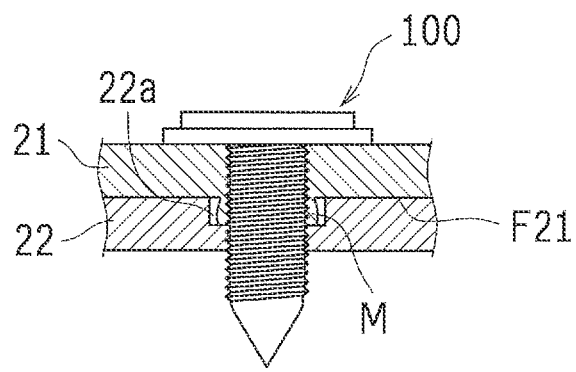
FIG. 2B is an explanatory view of another embodiment of the present disclosure, and illustrates a state where two thin plates are joined to each other with the self-tapping screw.

In a case where the recessed portion 22a formed in the bottom plate 22 as such, when the top plate 21 and the bottom plate 22 are joined to each other by screwing the self-tapping screw 100 thereto from one direction (one side) in a state where the top plate 21 and the bottom plate 22 are put on top of each other such that the recessed portion 22a of the bottom plate 22 is opened in the contacting face F21 between the top plate 21 and the bottom plate 22, an excess part Ni generated from the top plate 21 at the time when the self-tapping screw 100 penetrates through the top plate 21 flows into the recessed portion 22a opened in the contacting face F21 between the top plate 21 and the bottom plate 22 as illustrated in FIG. 2B. This makes it possible to restrain the excess part M from entering between the top plate 21 and the bottom plate 22. Hereby, it is possible to restrain a gap from occurring between the top plate 21 and the bottom plate 22 after the joining, thereby making it possible to secure dimension accuracy.

Further, in the present embodiment, the space into which the excess part Ni generated from the top plate 21 flows is formed of the recessed portion 22a (the recessed, portion 22a formed in the bottom plate 22) opened in the contacting face F21 between the top plate 21 and the bottom plate 22. Accordingly, after the joining (in the state illustrated in FIG. 2B), no gap is formed in the screwed part of the top plate 21 into which the self-tapping screw 100 is screwed. Hereby, it is possible to restrain deterioration in water cut-off performance, backlash of the plate materials, and the like that might be caused when a through-hole is formed in the top plate 21.

Note that a step to form the state of FIG. 2A corresponds to the "step of putting plate materials on top of each other such that a plate material having a recessed portion is placed so that the recessed portion is opened in a contacting face between the plate materials" in the present disclosure, and a step from FIG. 2A to 2B corresponds to the "step of penetrating the plate materials thus put on top of each other with a self-tapping screw" in the present disclosure.

Here, in the present embodiment, the structure after the joining as illustrated in FIG. 28 is another example of the "joining structure" in the present disclosure.

Embodiment 3

Next will be described another embodiment of the present disclosure with reference to FIGS. 3A, 3B.

The present embodiment describes a case where three thin plates (steel sheets) 31, 32, 33 are joined to each other by screwing the self-tapping screw 100 into the three thin plates 31, 33 in a state where the three thin plates 31, 32, 33 are put on top of each other in the screw-in direction.

In the following description, in terms of the three thin plates 31, 32, 33 put on top of each other in the screw-in direction, the thin plate 31 on the nearest side in the screw-in direction is referred to as a top plate 31 and the thin plate 33 on the deepest side in the screw-in direction is referred to as a bottom plate 33. Further, the thin plate 32 between the top plate 31 and the bottom plate 33 is referred to as an intermediate plate 32.

Figure 3A:
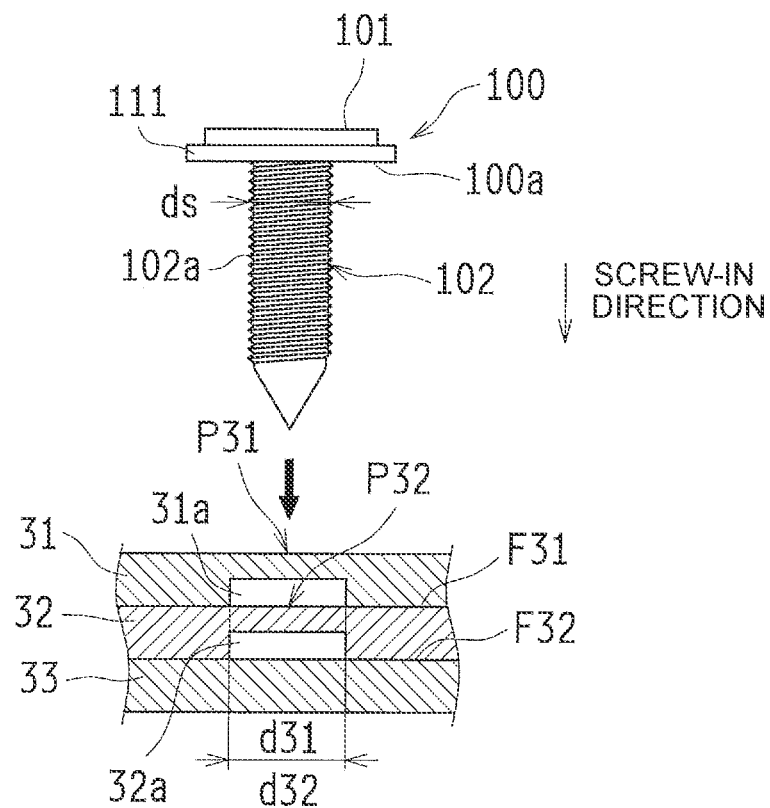
FIG. 3A is an explanatory view of another embodiment of the present disclosure, and illustrates a state before the self-tapping screw is screwed.

In the present embodiment, before the screwing operation of the self-tapping screw 100 is performed, the top plate 31 among the top plate 31 the intermediate plate 32, and the bottom plate 33 is subjected to cutting to form a recessed portion 31a having a cylindrical shape and opened in a contacting face F31 between the top plate 31 and the intermediate, plate 32 as illustrated in FIG. 3A. The recessed portion 31a is formed in a screwed part P31 of the top plate 31 into which the self-tapping screw 100 is screwed. The recessed portion 31a is formed such that its center (the center of the cylindrical shape) corresponds to the screwing point of the self-tapping screw 100. Further, the recessed portion 31a has an inside diameter d31 (the size of the inner periphery of the recessed portion) larger than the external-thread outside diameter ds of the self-tapping screw 100.

Further, the intermediate plate 32 is subjected to cutting to form a recessed portion 32a having a cylindrical shape and opened in a contacting face F32 between the intermediate plate 32 and the bottom plate 33 such that the recessed portion 32a is formed in a screwed part P32 of the intermediate plate 32 into which the self-tapping screw 100 is screwed. The recessed portion 32a is formed such that its center (the center of the cylindrical shape) corresponds to the screwing point of the self tapping screw 100. Further, the recessed portion 32a has an inside diameter d32 the (the size of the inner periphery of the recessed portion) larger than the external-thread outside diameter ds of the self-tapping screw 100.

The inside, diameter d31 of the recessed portion 31a and the inside diameter d32 of the recessed portion 32a are determined by a method similar to the method described in Embodiment 1. Note that, in the present embodiment, the inside diameter d31 of the recessed portion 31a is the same as the inside diameter d32 of the recessed portion 32a.

Figure 3B:
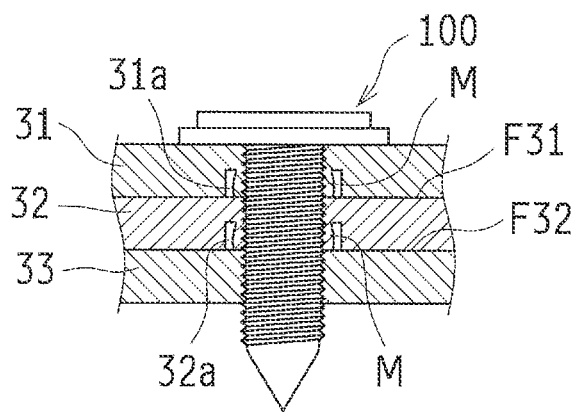
FIG. 3B is an explanatory view of another embodiment of the present disclosure, and illustrates a state where three thin plates are joined to each other with the self-tapping screw.

In a case where the recessed portion 31a is formed in the top plate 31 and the recessed portion 32a is formed in the intermediate plate 32 as such, when the top plate 31, the intermediate plate 32, and the bottom plate 33 are joined to each other by screwing the self-tapping screw 100 thereto from one direction (one side) in a state where the top plate 31, the intermediate plate 32, and the bottom plate 33 are put on top of each other such that the recessed portion 31a of the top plate 31 is opened in the contacting face F31 between the top plate 31 and the intermediate plate 32 and the recessed portion 32a of the intermediate plate 32 is opened in the contacting face F32 between the intermediate plate 32 and the bottom plate 33, an excess part M generated from the top plate 31 at the time when the self tapping screw 100 penetrates through the top plate 31 flows into the recessed portion 31a opened in the contacting face F31 between the top plate 31 and the intermediate plate 32 as illustrated in FIG. 3B. This makes it possible to restrain the excess part M from entering between the top plate 31 and the intermediate plate 32. Further, an excess part M generated from the intermediate plate 32 at the time when the self-tapping screw 100 penetrates through the intermediate plate 32 flows into the recessed portion 32a opened in the contacting face F32 between the intermediate plate 32 and the bottom plate 33 as illustrated in FIG. 3B. This makes it possible to restrain the excess part M from entering between the intermediate plate 32 and the bottom plate 33. Hereby, it is possible to restrain a gap from occurring between the top plate 31 and the intermediate plate 32 and between the intermediate plate 32 and the bottom plate 33 after the joining (in the state illustrated in FIG. 3B).

Further, in the present embodiment, the space into which the excess part M generated from the top plate 31 flows is formed of the recessed portion 31a opened in the contacting face F31 between the top plate 31 and the intermediate plate 32. Accordingly, after the joining, no gap is formed in the screwed part (a part on the near side from the recessed portion 31a) of the top plate 31 into which the self-tapping screw 100 is screwed. Hereby, it is possible to restrain deterioration in water cut-off performance, backlash of the plate materials, and the like that might be caused when a through-hole is formed in the top plate 31. Further, the space into which the excess part M generated from the intermediate plate 32 flows is formed of the recessed portion 32a (the recessed portion 32a formed in the intermediate plate 32) opened in the contacting face F32 between the intermediate plate 32 and the bottom plate 33. Accordingly, problems such as backlash do not occur in terms of the intermediate plate 32.

Note that a step to form the state of FIG. 3A corresponds to the "step of putting plate materials on top of each other such that a plate material having a recessed portion is placed so that the recessed portion is opened in a contacting face between the plate materials" in the present disclosure, and a step from FIG. 3A to FIG. 3B corresponds to the "step of penetrating the plate materials thus put on top of each other with a self-tapping screw" in the present disclosure.

Here, in the present embodiment, the structure after the joining as illustrated in FIG. 3B is another example of the "joining structure" in the present disclosure.

Embodiment 4

Next will be described another embodiment of the present disclosure with reference to FIGS. 4A, 4B.

The present embodiment describes a case where three thin plates (steel sheets) 41, 42, 43 are joined to each other by screwing the self-tapping screw 100 into the three thin plates 41, 42, 43 in a state where the three thin plates 41, 42, 43 are put on top of each other in the screw-in direction.

In the following description, in terms of the three thin plates 41, 42, 43 put on top of each other in the screw-in direction, the thin plate 41 on the nearest side in the screw-in direction is referred to as a top plate 41 and the thin plate 43 on the deepest side in the screw-in direction is referred to as a bottom plate 43. Further, the thin plate 42 between the top plate 41 and the bottom plate 43 is referred to as an intermediate plate 42.

Figure 4A:
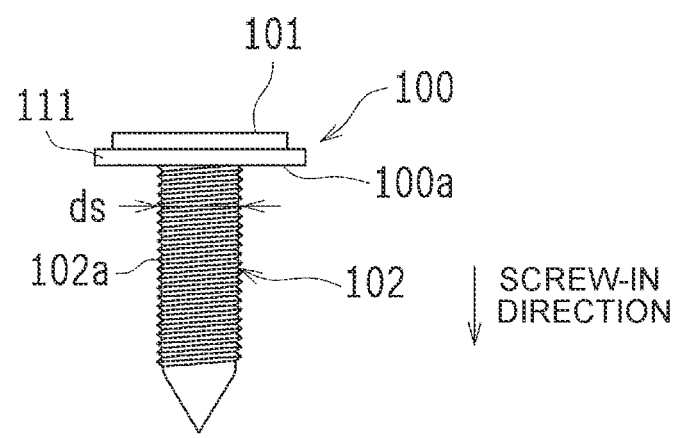
FIG. 4A is an explanatory view of another embodiment of the present, disclosure, and illustrates a state before the self-tapping screw is screwed.

In the present embodiment, before the screwing operation of the self-tapping screw 100 is performed, the intermediate plate 42 among the top plate 41, the intermediate plate 422 and the bottom plate 43 is subjected to cutting to form a recessed portion 42a having a cylindrical shape and opened in a contacting face F41 between the intermediate plate 42 and the top plate 41 placed on the near side therefrom, such that the recessed portion 42a is formed in a screwed part P42 of the intermediate plate 42 into which the self-tapping screw 100 is screwed, as illustrated in FIG. 4A. The recessed portion 42a is formed such that its center (the center of the cylindrical shape) corresponds to the screwing point of the self-tapping screw 100. Further, the recessed portion 42a has an inside diameter d42 (the size of the inner periphery of the recessed portion) larger than the external-thread outside diameter cis of the self-tapping screw 100.

Further, the bottom plate 43 is also subjected to cutting to form a recessed portion 43a having a cylindrical shape and opened in a contacting face F42 between the bottom plate 43 and the intermediate plate 42 on the near side therefrom, such that the recessed portion 43a is formed in a screwed part P43 of the bottom plate 43 into which the self-tapping screw 100 is screwed. The recessed portion 43a is formed such that its center (the center of the cylindrical shape) corresponds to the screwing point of the self-tapping screw 100. Further, the recessed portion 43a has an inside diameter d43 (the size of the inner periphery of the recessed portion) larger than the external-thread outside diameter ds of the self-tapping screw 100.

The inside diameter d42 of the recessed portion 42a and the inside diameter d43 of the recessed portion 43a are determined by a method similar to the method described in Embodiment 1. Note that, in the present embodiment, the inside diameter d42 of the recessed portion 42a is the same as the inside diameter d43 of the recessed portion 43a.

Figure 4B:
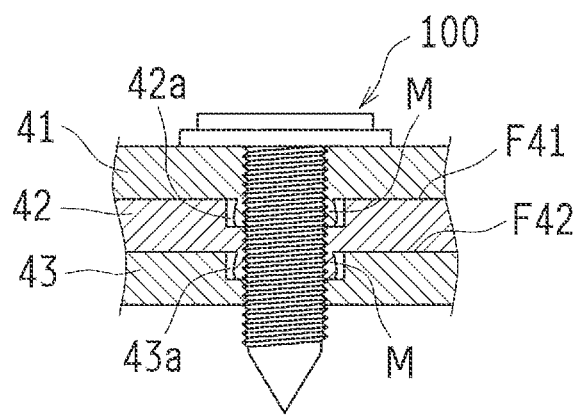
FIG. 4B is an explanatory view of another embodiment of the present disclosure, and illustrates a state where three thin plates are joined to each other with the self-tapping screw.

In a case where the recessed portion 42a is formed in the intermediate plate 42 and the recessed portion 43a is formed in the bottom plate 43 as such, when the top plate 41, the intermediate plate 42, and the bottom plate 43 are joined to each other by screwing the self-tapping screw 100 thereto from one direction (one side) in a state where the top plate 41, the intermediate plate 42, and the bottom plate 43 are put on top of each other such that the recessed portion 42a of the intermediate plate 42 is opened in the contacting face F41 between the top plate 41 and the intermediate plate 42 and the recessed portion 43a of the bottom plate 43 is opened in the contacting face F42 between the intermediate plate 42 and the bottom plate 43, an excess part M generated from the top plate 41 at the time when the self-tapping screw 100 penetrates, through the top plate 41 flows into the recessed portion 42a opened in the contacting face F41 between the top plate 41 and the intermediate plate 42 as illustrated in FIG. 4B. Further, an excess part M generated from the intermediate plate 42 at the time when the self-tapping screw 100 penetrates through the intermediate plate 42 flows into the recessed portion 43a opened in the contacting, face F42 between the intermediate plate 42 and the bottom plate 43 as illustrated in FIG. 4B. This makes it possible to restrain a gap from occurring between the top plate 41 and the intermediate plate 42 and between the intermediate plate 42 and the bottom plate 43 after the joining (in the state illustrated in FIG. 4B).

Further, in the present embodiment, the space into which the excess part M generated from the top plate 41 flows is formed of the recessed portion 42a opened in the contacting face F41 between the top plate 41 and the intermediate plate 42. Accordingly, after the joining, no gap is formed in the screwed part of the top plate 41 into which the self-tapping screw 100 is screwed. Hereby, it is possible to restrain deterioration in water cut-off performance, backlash of the plate materials, and the like that might be caused when a through-hole is formed in the top plate 41. Further, the space into which the excess part M generated from the intermediate plate 42 flows is formed of the recessed portion 43a (the recessed portion 43a formed in the bottom plate 43) opened in the contacting face F42 between the intermediate plate 42 and the bottom plate 43. Accordingly, problems such as backlash do not occur in terms of the intermediate plate 42.

Note that a step to form the state of FIG. 4A corresponds to the "step of putting plate materials on top of each other such that a plate material having a recessed portion is placed so that the recessed portion is opened in a contacting face between the plate materials" in the present disclosure, and a step from FIG. 4A to FIG. 4B corresponds to the "step of penetrating the plate materials thus put on top of each other with a self-tapping screw" in the present disclosure.

Here, in the present embodiment, the structure after the joining as illustrated in FIG. 4B is another example of the "joining structure" in the present disclosure.

Embodiment 5

Next will be described another embodiment of the present disclosure with reference to FIGS. 5A, 5B.

The present embodiment describes a ease where three thin plates (steel sheets) 51, 52, 53 are joined to each other by screwing the self-tapping screw 100 into the three thin plates 51, 52, 53 in a state where the three thin plates 51, 52, 53 are put on top of each other in the screw-in direction.

In the following, description, in terms of the three thin plates 51, 52, 53 put on top of each other in the screw-in direction, the thin plate 51 on the nearest side in the screw-in direction is referred to as a top plate 51 and the thin plate 53 on the deepest side in the screw-in direction is referred to as a bottom plate 53. Further, the thin plate 52 between the top plate 51 and the bottom plate 53 is referred to as an intermediate plate 52.

Figure 5A:
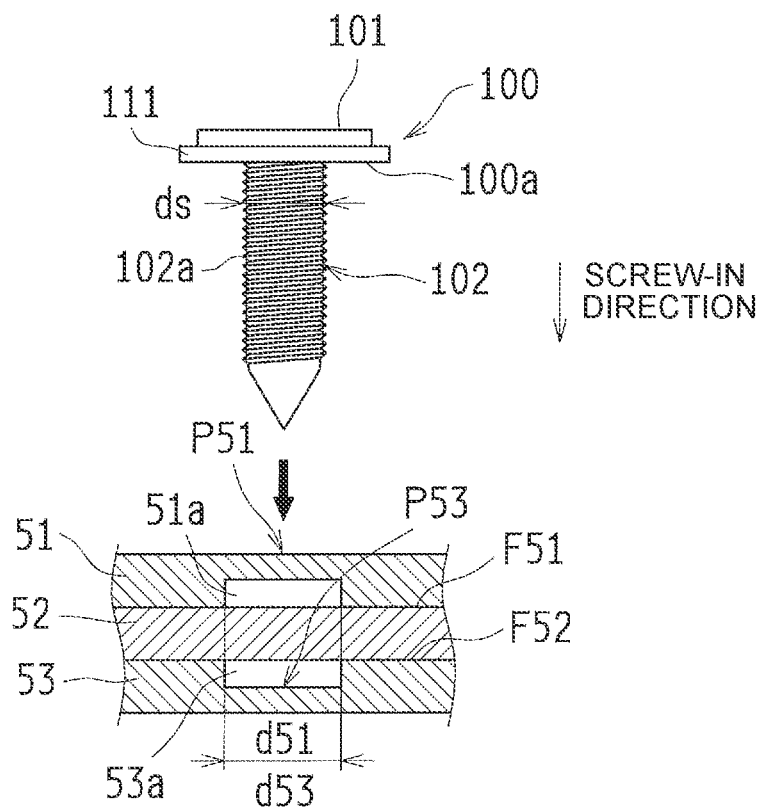
FIG. 5A is an explanatory view of another embodiment of the present disclosure, and illustrates a state before the self-tapping screw is screwed.

In the present embodiment, before the screwing operation of the self-tapping screw 100 is performed, the top plate 51 among the top plate 51, the intermediate plate 52, and the bottom plate 53 is subjected to cutting to form a recessed portion 51a having a cylindrical shape and opened in a contacting fare F51 between the top plate 51 and the intermediate plate 52, such that the recessed portion 51a is formed in a screwed part P51 of the top plate 51 into which the self-tapping screw 100 is screwed, as illustrated in FIG. 5A. The recessed portion 51a is formed such that its center (the center of the cylindrical shape) corresponds to the screwing point of the self-tapping screw 100. Further, the recessed portion 51a has an inside diameter d51 (the size of the inner periphery of the recessed portion) larger than the external-thread outside diameter ds of the self-tapping screw 100.

Further, the bottom plate 53 is also subjected to cutting to form a recessed portion 53a having a cylindrical shape and opened in a contacting face F52 between the bottom plate 53 and the intermediate plate 52, such that the recessed portion 53a is formed in a screwed part P53 of the bottom plate 53 into which the self-tapping screw 100 is screwed. The recessed portion 53a is formed such that its center (the center of the cylindrical shape) corresponds to the screwing point of the self-tapping screw 100. Further, the recessed portion 53a has an inside diameter d53 (the size of the inner periphery of the recessed portion) larger than the external-thread outside diameter ds of the self-tapping screw 100.

The inside diameter d51 of the recessed portion 51a and the inside diameter d53 of the recessed portion 53a are determined by a method similar to the method described in Embodiment 1. Note that, in the present embodiment, the inside diameter d51 of the recessed portion 51a is the same as the inside diameter d53 of the recessed portion 53a.

Figure 5B:
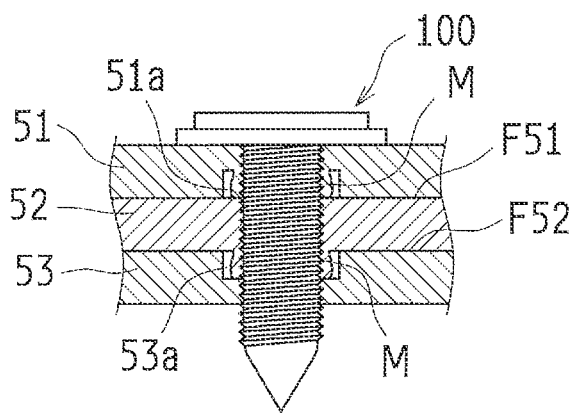
FIG. 5B is an explanatory view of another embodiment of the present disclosure, and illustrates a state where three thin plates are joined to each other with the self-tapping screw.

In a case where the recessed portion 51a is formed in the top plate 51 and the recessed portion 53a is formed in the bottom plate 53 as such, when the top plate 51, the intermediate plate 52, and the bottom plate 53 are joined to each other by screwing the self-tapping screw 100 thereto from one direction (one side) in a state where the top plate 51, the intermediate plate 52, and the bottom plate 53 are put on top of each other such that the recessed portion 51a of the top plate Si is opened in the contacting face F51 between the top plate 51 and the intermediate plate 52 and the recessed portion 53a of the bottom plate 53 is opened in the contacting face F52 between the intermediate plate 52 and the bottom plate 53, an excess part M generated from the top plate 51 at the time when the self-tapping screw 100 penetrates through the top plate 51 flows into the recessed portion 51a opened in, the contacting face F51 between the top plate 51 and the intermediate plate 52 as illustrated in FIG. 5B. This makes it possible to restrain the excess part M from entering between the top plate 51 and the intermediate plate 52. Further, an excess part M generated from the intermediate plate 52 at the time when the self-tapping screw 100 penetrates through the intermediate plate flows into the recessed portion 53a opened in the contacting face F52 between, the intermediate plate 52 and the bottom plate 53 as illustrated in FIG. 5B. This makes it possible to restrain the excess part M from entering between the intermediate plate 52 and the bottom plate 53. Hereby, it is possible to restrain a gap from occurring between the top plate 51 and the intermediate plate 52 and between the intermediate plate 52 and the bottom plate 53 after the joining (in the state illustrated in FIG. 5B).

Further, in the present embodiment, the space into which the excess part M generated from the top plate 51 flows is formed of the recessed portion 51a opened in the contacting face F51 between the top plate 51 and the intermediate plate 52. Accordingly, after the joining, no gap is formed in the screwed part (a part on the near side from the recessed portion 51a) of the top plate 51 into which the self-tapping screw 100 is screwed. Hereby, it is possible to restrain deterioration in water cut-off performance, backlash of the plate materials, and the like that might be caused when a through-hole is formed in the top plate 51. Further, the space into which the excess part M generated from the intermediate plate 52 flows is formed of the recessed portion 53a (the recessed portion 53a formed in the bottom plate 53) opened in the contacting face F52 between the intermediate plate 52 and the bottom plate 53. Accordingly, it is not necessary to form a recessed portion in the intermediate plate 52.

Note that a step to form the state of FIG. 5A corresponds to the "step of putting plate materials on top of each other such that a plate material having a recessed portion is placed so that the recessed portion is opened in a contacting face between the plate materials" in the present disclosure, and a step from FIG. 5A to FIG. 5B corresponds to the "step of penetrating, the plate materials thus put on top of each other with a self-tapping screw" in the present disclosure.

Further, the embodiment illustrated in FIG. 5B is one example of the following in the present disclosure: "in a case of joining three or more plate materials, recessed portions are formed with a combination of a configuration in which a recessed portion is formed in the plate material on the nearest side in the screw-in direction of the self-tapping screw, among the plate materials put on top on each other, with a configuration which a recessed portion is formed in the plate material on the deep side in the screw-in direction of the self-tapping screw, among the plate materials put on top on each other in the screw-in direction of the self-tapping screw."

Here, in the present embodiment, the structure after the joining as illustrated in FIG. 5B is another example of the "joining structure" in the present disclosure.

Embodiment 6

Next will be described another embodiment of the present disclosure with reference to FIGS. 6A, 6B.

The present embodiment describes a case where two thin plates (steel sheets) 61, 62 are joined to each other by screwing the self-tapping screw 100 into the two thin plates 61, 62 in a state where the two thin plates 61, 62 are put on top of each other in the screw-in direction of the self-tapping screw 100.

In the following description, in terms of the two thin plates 61, 62 put on top of each other in the screw-in direction, the thin plate 61 on the near side in the screw-in direction is referred to as a top plate 61 and the thin plate 62 on the deep side in the screw-in direction is referred to as a bottom plate 62.

Figure 6A:
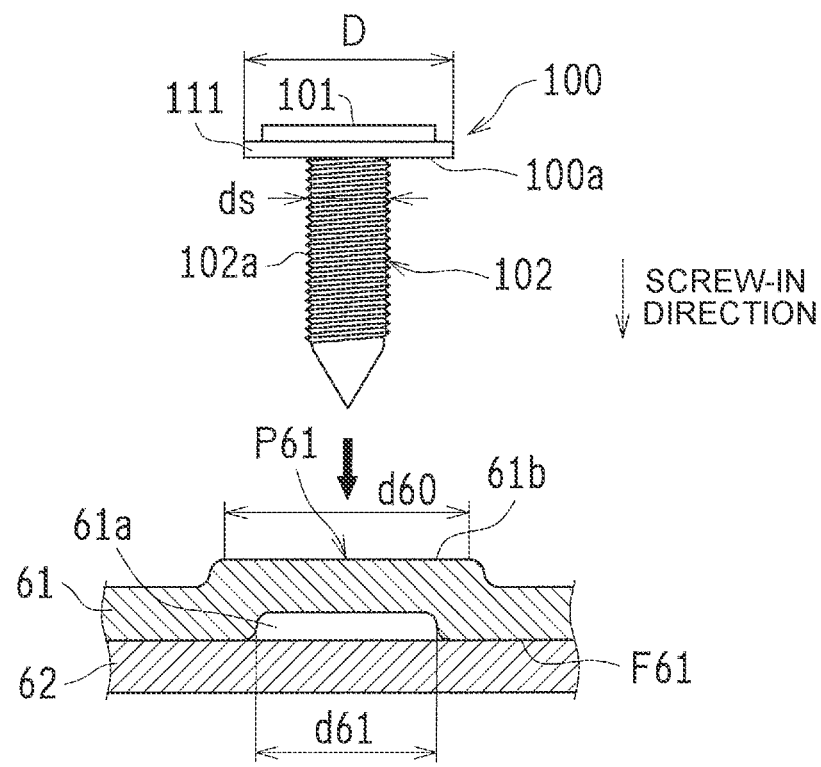
FIG. 6A is an explanatory view of another embodiment of the present disclosure, and illustrates a state before the self-tapping screw is screwed.

In the present embodiment, before the screwing operation of the self-tapping screw 100 is performed, the top plate 61 out of the top plate 61 and the bottom plate 62 is subjected to press molding to form a recessed portion 61a having a cylindrical shape and opened in a contacting face F61 between the top plate 61 and the bottom plate 62, such that the recessed portion 61a is formed in a screwed part P61 of the top plate 61 into which the self-tapping screw 100 is screwed, as illustrated in FIG. 6A. The recessed portion 61a is formed such that its center (the center of the cylindrical shape) corresponds to the screwing point of the self-tapping screw 100. Even in a case where the recessed portion 61a is formed by press molding as such, the recessed portion 61a is formed to have an inside diameter d61 (the size of the inner periphery of the recessed portion) larger than the external-thread outside diameter ds of the self-tapping screw 100. The inside diameter d61 of the recessed portion 61a is determined by a method similar to the method, described in Embodiment 1.

Figure 6B:
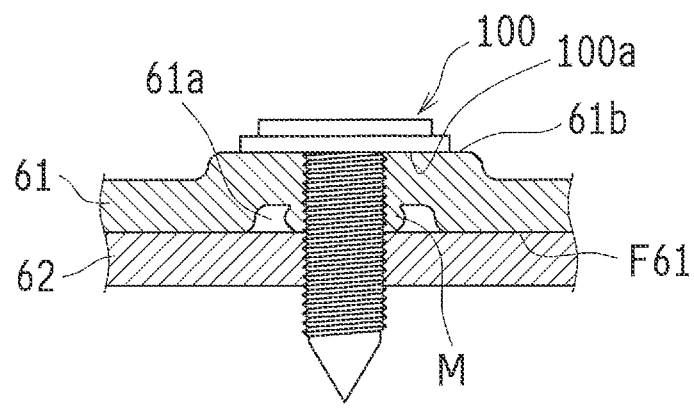
FIG. 6B is an explanatory view of another embodiment of the present disclosure, and illustrates a state where two thin, plates are joined to each other with the self-tapping screw.

In a case where the recessed portion 61a is formed in the top plate 61 as such, when the top plate 61 and the bottom plate 62 are joined to each other by screwing the sell tapping screw 100 thereto from one direction (one side) in a state where the top plate 61 and the bottom plate 62 are put on top of each other such that the recessed portion 61a of the top plate 61 is opened in the contacting face F61 between the top plate 61 and the bottom plate 62, an excess part M generated from the top plate 61 at the time when the self-tapping screw 100 penetrates through the top plate 61 flows into the recessed portion 61a opened in the contacting face F61 between the top plate 61 and the bottom plate 62 as illustrated in FIG. 6B. This makes it possible to restrain the excess part M from entering between the top plate 61 and the bottom plate 62. Hereby, it is possible to restrain a gap from occurring between the top plate 61 and the bottom plate 62 after the joining (in the state illustrated in FIG. 6B), thereby making it possible to secure dimension accuracy.

Further, in the present embodiment, the space into which the excess part M generated from the top plate 61 flows is formed of the recessed portion 61a opened in the contacting face F61 between the top plate 61 and the bottom plate 62. Accordingly, after the joining, no gap is formed in the screwed part (a part on the near side from the recessed portion 61a) of the top plate 61 into which the self-tapping screw 100 is screwed. Hereby, it is possible to restrain deterioration in water cut-off performance, backlash of the plate materials, and the like that might be caused when a through-hole is formed in the top plate 61.

Here, in the present embodiment, since the recessed portion 61a of the top plate 61 is formed by press molding, the top plate 61 is formed into a shape having a projecting portion on the opposite side from a part where the recessed portion 61a is formed, as illustrated in FIG. 6A, so that a flat surface (a generally circular flat surface) 61b of the projecting portion serves as the suffice on which the self-tapping screw 100 sits. In the present embodiment, the flat surface (the generally circular flat surface) 61b of the projecting portion of the top plate 61 has a diameter d60 equal to or more than the diameter D of the seating face 100a of the self-tapping screw 100. Hereby, after the joining, the entire seating face 100a of the self-tapping screw 100 surely sits on the top plate 61. Accordingly, even if the recessed portion 61a is formed by press molding, it is possible to secure reliability of the joining.

Note that a step to form the state of FIG. 6A corresponds to the "step of putting plate materials on top of each other such that a plate material having a recessed portion is placed so that the recessed portion is opened in a contacting face between the plate materials" in the present disclosure, and a step from FIG. 6A to FIG. 6B corresponds to the "step of penetrating the plate materials thus put on top of each other with a self-tapping screw" in the present disclosure.

Here, in the present embodiment, the structure after the joining as illustrated in FIG. 6B is another example of the "joining structure" in the present disclosure.

Embodiment 7

Next will be described another embodiment of the present disclosure with reference to FIGS. 7A, 7B.

The present embodiment describes a case where three thin plates 71, 72, 73 are joined to each other by screwing the self-tapping screw 100 into the three thin plates 71, 72, 73 in a state where the three thin plates 71, 72, 73 are put on top of each other in the screw-in direction.

In the following description, in terms of the three thin plates 71, 72, 73 put on top of each other in the screw-in direction, the thin plate 71 on the nearest side in the screw-in direction is referred to as a top plate 71 and the thin plate 73 on the deepest side in the screw-in direction is referred to as a bottom plate 73. Further, the thin plate 72 between the top plate 71 and the bottom plate 73 is referred to as an intermediate plate 72.

Figure 7A:
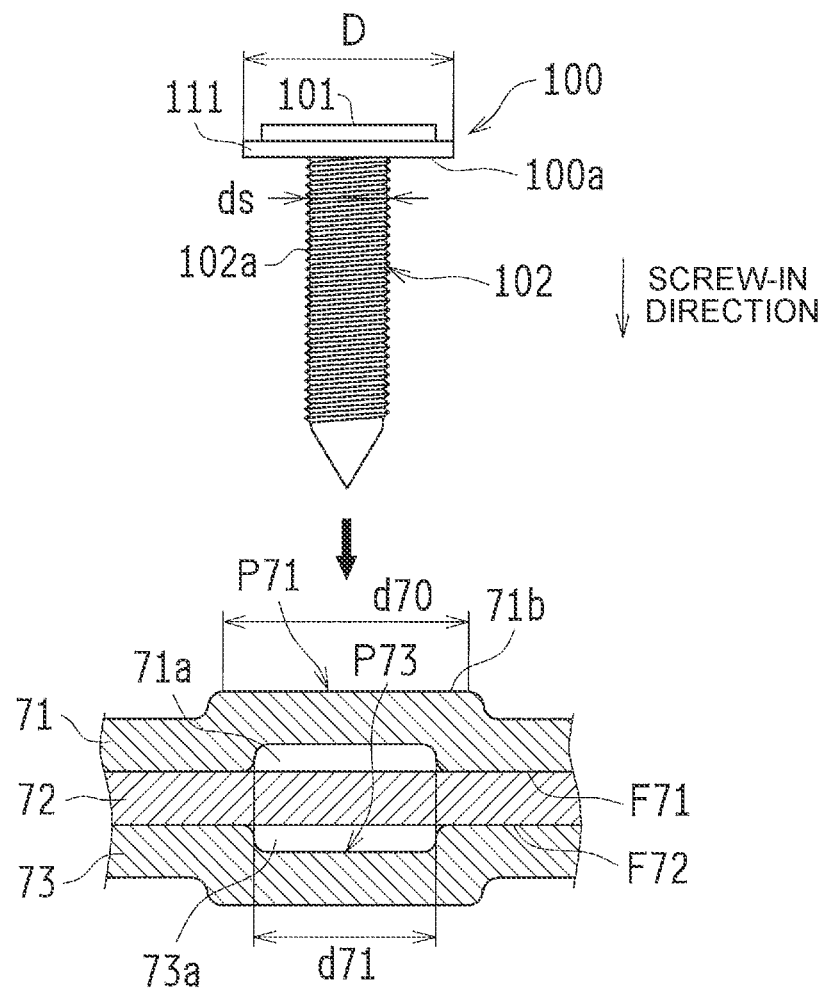
FIG. 7A is an explanatory view of another embodiment of the present disclosure, and illustrates a state before the self-tapping screw is screwed.

In the present embodiment, before the screwing operation of the self-tapping screw 100 is performed, the top plate 71 among the top plate 71, the intermediate plate 72, and the bottom plate 73 is subjected to press molding to form a recessed portion 71a having a cylindrical shape and opened in a contacting face F71 between the top plate 71 and the intermediate plate 72, such that the recessed portion 71a is formed in a screwed part P71 of the top plate 71 into which the self-tapping screw 100 is screwed, as illustrated in FIG. 7A. The recessed portion 71a is formed such that its center (the center of the cylindrical shape) corresponds to the screwing point of the self-tapping screw 100.

Further, the bottom plate 73 is also subjected to press molding, to form a recessed portion 73a having a cylindrical shape and opened on a contacting face F72 between the bottom plate 73 and the intermediate plate 72, such that the recessed portion 73a is formed in a screwed part P73 of the bottom plate 73 into which the self-tapping screw 100 is screwed. The recessed portion 73a is formed such that its center (the center of the cylindrical shape) corresponds to the screwing point of the self-tapping screw 100.

In the present embodiment, the recessed portion 71a formed in the top plate 71 also has an inside diameter d71 (the size of the inner periphery of the recessed portion) larger than the external-thread outside diameter ds of the self-tapping screw 100. The inside diameter d71 of the recessed portion 71a is determined by a method similar to the method described in Embodiment 1. Note that the inside diameter of the recessed portion 73a of the bottom plate 73 is the same as the inside diameter d71 of the recessed portion 71a of the top plate 71.

Figure 7B:
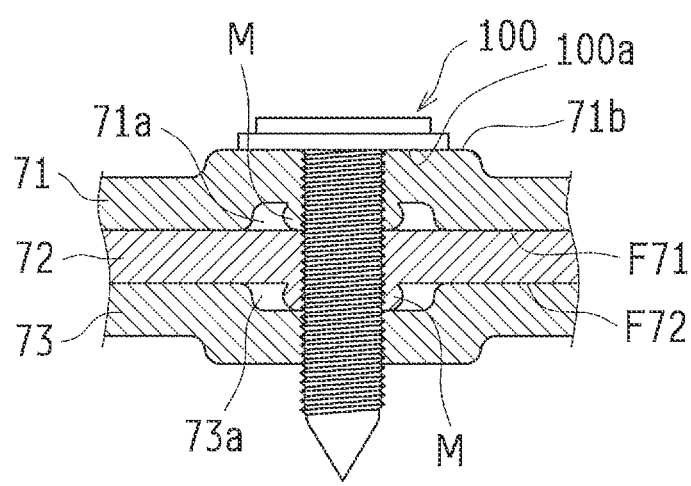
FIG. 7B is an explanatory view of another embodiment of the present disclosure, and it rates a state where three thin plates are joined to each other with the self-tapping screw.
Figure 8:
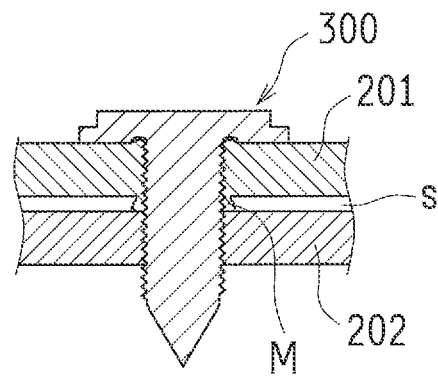
FIG. 8 is a sectional view illustrating a state where a gap is caused between a top plate and a bottom plate when the top plate and the bottom plate are joined to each other with the self-tapping screw.

In a case where the recessed portion 71a is formed in the top plate 71 and the recessed portion 73a is formed in the bottom plate 73 as such, when the top plate 71, the intermediate plate 72, and the bottom plate 73 are joined to each other by screwing the self-tapping screw 100 thereto from one direction (one side) in a state where the top plate 71, the intermediate plate 72, and the bottom plate 73 are put on top of each other such that the recessed portion 71a of the top plate 71 is opened in the contacting face F71 between the top plate 71 and the intermediate plate 72 and the recessed portion 73a of the bottom plate 73 is opened in the contacting face F72 between the intermediate plate 72 and the bottom plate 73, an excess part M generated from the top plate 71 at the time when the self-tapping screw 100 penetrates through the top plate 71 flows into the recessed portion 71a opened in the contacting face F71 between the top plate 71 and the intermediate plate 72 as illustrated in FIG. 7B. This makes it possible to restrain the excess part M from entering between the top plate 71 and the intermediate plate 72. Further, an excess part M generated from the intermediate plate. 72 at the time when the self-tapping screw 100 penetrates through the intermediate plate 72 flows into the recessed portion 73a opened in the contacting face F72 between the intermediate plate 72 and the bottom plate 73 as illustrated in FIG. 7. This makes it possible to restrain the excess part M from entering between the intermediate plate 72 and the bottom plate 73. Hereby, it is possible to restrain a gap from occurring between the top plate 71 and the intermediate plate 72 and between the intermediate plate 72 and the bottom plate 73 after the joining (in the state illustrated in FIG. 7B).

Further, in the present embodiment, the space into which the excess part M generated from the top plate 71 flows is formed of the recessed portion 71a opened in the contacting face F71 between the top plate 71 and the intermediate plate 72. Accordingly, after the joining, no gap is formed in the screwed part (a part on the near side from the recessed portion 71a) of the top plate 71 into which the self-tapping screw 100 is screwed, Hereby, it is possible to restrain problems such as deterioration in water cut-off performance, backlash of the plate materials, and the like that might be caused when a through-hole is formed in the top plate 71. Further, the space into which the excess part M generated from the intermediate plate 72 flows is formed of the recessed portion 73a (the recessed portion 73a formed in the bottom plate 73) opened in the contacting face F72 between the intermediate plate 72 and the bottom plate 73. Accordingly, it is not necessary to form a recessed portion in the intermediate plate 72.

Here, in the present embodiment, a flat surface (a generally circular flat surface) 71b of a projecting portion of the top plate 71 in a part where the recessed portion 71a is formed has a diameter d70 equal to or more than the diameter D of the seating face 100a of the self-tapping screw 100. Hereby, after the joining, the entire seating, face 100a of the self-tapping screw 100 surely sits on the top plate 71. Accordingly, even if the recessed portion 71a is formed by press molding, it is possible to secure reliability of the joining.

Besides, in the present embodiment, it is not necessary to form a recessed portion in the intermediate plate 72. Accordingly, in a case where the recessed portions 71a, 73a are formed by press molding, even if three steel sheets, i.e., the top plate 71, the intermediate plate 72, and the bottom plate 73 are joined to each other, the three steel sheets can be joined without any gap.

Note that a step to form the state of FIG. 7A corresponds to the "step of putting plate materials on top of each other such that a plate material having a recessed portion is placed so that the recessed portion is opened in a contacting face between the plate materials" in the present disclosure, and a step from FIG. 7A to FIG. 7B corresponds to the "step of penetrating the plate materials thus put on top of each other with a self-tapping screw" in the present disclosure.

Here, in the present embodiment, the structure after the joining as illustrated in FIG. 7B is another example of the "joining structure" in the present disclosure.

Other Embodiments

It should be noted that the embodiments described herein are just examples in all respects and are not limitative.

Accordingly, the technical scope of the present disclosure is not interpreted only by the above embodiments, but is defined based on the description in Claims. Further, the technical scope of the present disclosure includes all modifications made within the meaning and scope equivalent to Claims.

For example, the embodiments deal with the examples in which the present disclosure is applied to the cases where two or three thin plates (plate materials) are joined to each other. However, the present disclosure is not limited to them, and the present disclosure is also applicable to cases where four or more thin plates (plate materials) are joined to each other.

Note that, in the cases where four or more plate materials are joined to each other, the recessed portion may be formed in the plate material on the near side in the screw-in direction of the self-tapping screw, among the plate materials put on top on each other in the screw-in direction of the self-tapping screw, similarly to the configuration illustrated in FIG. 3A. Alternatively, similarly to the configuration illustrated in FIG. 4A, the recessed portion may be formed in the plate material on the deep side in the screw-in direction of the self-tapping screw, among the plate materials put on top on each other in the screw-in direction of the self-tapping screw. Further, like the configuration illustrated in FIG. 5A or 7A, the recessed portions may be formed with a combination of the configuration in which the recessed portion is formed in the plate material on the near side in the screw-in direction of the self-tapping screw, with the configuration in which the recessed portion is formed in the plate material on the deep side in the screw-in direction of the self-tapping screw.

In the embodiments, the recessed portion formed in a steel sheet (plate material) has a cylindrical shape. However, the present disclosure is not limited to this, and the recessed portion may be a recessed portion having a polygonal sectional shape, of may be a recessed portion having any given sectional shape.

The embodiments deal with the case where the present disclosure is applied to the joining of steel sheets (thin plates). However, the present disclosure is not limited to this, and the present disclosure is also applicable to joining of metal plate materials other than the steel sheets or plate materials made of resin.

The present disclosure is usable for a joining method for joining a plurality of plate materials by use of a self-tapping screw.

What is claimed is:

1. A joining method for joining a first plate material to a second plate material by screwing a self-tapping screw into the first plate material and the second plate material from one direction, the joining method comprising:

putting the first plate material and the second plate material on top of each other such that a first recessed portion formed in at least one of the first plate material and the second plate material is opened in a contacting face between the first plate material and the second plate material, the first recessed portion being formed in a part into which the self-tapping screw is screwed in the at least one of the first plate material and the second plate material, the first recessed portion having an inner periphery larger than an external-thread outside diameter of the self-tapping screw; and penetrating the first plate material and the second plate material with the self-tapping screw, the first plate material being placed on a near side in a screw-in direction of the self-tapping screw relative to the second plate material, wherein an excess part generated from the first plate material at a time when the self-tapping screw penetrates through the first plate material flows into the first recessed portion, wherein, in a case where the first recessed portion is formed in a cylindrical shape by press molding in the first plate material that is a plate material on a nearest side in the screw-in direction of the self-tapping screw, a projecting part of the first plate material toward the near side of the first plate material in the screw-in direction is formed to have a diameter equal to or more than a diameter of a seating face of the self-tapping screw, by the press molding of the first recessed portion.

2. The joining method according to claim 1, further comprising, in a case where a third plate material is further provided such that the second plate material and the third plate material are put on top of each other and joined to each other, putting the second plate material and the third plate material on top of each other such that a second recessed portion formed in at least one of the second plate material and the third plate material is opened in a contacting face between the second plate material and the third plate material, the second recessed portion being formed in a part into which the self-tapping screw is screwed in the at least one of the second plate material and the third plate material, the second recessed portion having an inner periphery larger than the external-thread outside diameter of the self-tapping screw.

3. The joining method according to claim 2, wherein, in the case where the third plate material is further provided such that the second plate material and the third plate material are put on top of each other and joined to each other, when the first recessed portion is formed by press molding, the first recessed portion is formed in the first plate material that is a plate material on the nearest side in the screw-in direction of the self-tapping screw, such that the first recessed portion is opened in the contacting face between the first plate material and the second plate material, and the second recessed portion is formed in the third plate material that is a plate material on a deepest side in the screw-in direction of the self-tapping screw, such that the second recessed portion is opened in the contacting face between the third plate material and the second plate material.

4. A joining method for joining a first plate material to a second plate material by screwing a self-tapping screw into the first plate material and the second plate material from one direction, the joining method comprising:

putting the first plate material and the second plate material on top of each other such that a first recessed portion formed in at least one of the first plate material and the second plate material is opened in a contacting face between the first plate material and the second plate material, the first recessed portion being formed in a part into which the self-tapping screw is screwed in the at least one of the first plate material and the second plate material, the first recessed portion having an inner periphery larger than an external-thread outside diameter of the self-tapping screw; and penetrating the first plate material and the second plate material with the self-tapping screw, the first plate material being placed on a near side in a screw-in direction of the self-tapping screw relative to the second plate material, wherein an excess part generated from the first plate material at a time when the self-tapping screw penetrates through the first plate material flows into the first recessed portion, in a case where a third plate material is further provided such that the second plate material and the third plate material are put on top of each other and joined to each other, putting the second plate material and the third plate material on top of each other such that a second recessed portion formed in at least one of the second plate material and the third plate material is opened in a contacting face between the second plate material and the third plate material, the second recessed portion being formed in a part into which the self-tapping screw is screwed in the at least one of the second plate material and the third plate material, the second recessed portion having an inner periphery larger than the external-thread outside diameter of the self-tapping screw, wherein, in the case where the third plate material is further provided such that the second plate material and the third plate material are put on top of each other and joined to each other, when the first recessed portion is formed by press molding, the first recessed portion is formed in the first plate material that is a plate material on the nearest side in the screw-in direction of the self-tapping screw, such that the first recessed portion is opened in the contacting face between the first plate material and the second plate material, and the second recessed portion is formed in the third plate material that is a plate material on a deepest side in the screw-in direction of the self-tapping screw, such that the second recessed portion is opened in the contacting face between the third plate material and the second plate material.

* * * * *

UNITED STATES PATENT AND TRADEMARK OFFICE
CERTIFICATE OF CORRECTION

PATENT NO. : 10,626,907 B2
APPLICATION NO. : 15/946828
DATED : April 21, 2020
INVENTOR(S) : Yoshihiro Iwano and Kosuke Sakurai It is certified that error appears in the above-identified patent and that said Letters Patent is hereby corrected as shown below:

On the Title Page

Item (72), inventor 1, city, delete "Toyota" and insert --Toyota-shi Aichi-ken--, therefor.

Item (72), inventor 2, city, delete "Toyota" and insert --Toyota-shi Aichi-ken--, therefor.

In the Specification

Column 1, Line 21, delete "knot" and insert --known--, therefor.

Column 4, Line 2, delete "second, plate" and insert --second plate--, therefor.

Column 4, Line 17, delete "materials," and insert --materials--, therefor.

Column 5, Line 2, delete "it rates" and insert --illustrates--, therefor.

Column 8, Line 12, delete "recessed, portion" and insert --recessed portion--, therefor.

Column 8, Line 41, delete "31, 33" and insert --31, 32, 33--, therefor.

Column 8, Line 57, delete "intermediate, plate 32" and insert --intermediate plate 32--, therefor.

Column 9, Line 12, delete "inside, diameter d31" and insert --inside diameter d31--, therefor.

Column 10, Line 32, delete "plate 422" and insert --plate 42--, therefor.

Column 11, Line 12, delete "penetrates," and insert --penetrates--, therefor.

Column 12, Line 9, delete "fare F51" and insert --face F51--, therefor.

Signed and Sealed this
Second Day of June, 2020

Andrei Iancu
*Director of the United States Patent and Trademark Office*

CERTIFICATE OF CORRECTION (continued)
U.S. Pat. No. 10,626,907 B2

Column 13, Line 27, delete "FIG. SB" and insert --FIG. 5B--, therefor.

Column 14, Line 12, delete "method," and insert --method--, therefor.

Column 14, Line 16, delete "sell tapping" and insert --self-tapping--, therefor.

Column 16, Line 24, delete "screwed," and insert --screwed.--, therefor.